(12) United States Patent
Ikeda et al.

(10) Patent No.: US 9,863,604 B2
(45) Date of Patent: Jan. 9, 2018

(54) PHOSPHOR WHEEL, LIGHT SOURCE DEVICE, AND PROJECTION IMAGE DISPLAY APPARATUS

(71) Applicant: Panasonic Intellectual Property Management Co., Ltd., Osaka (JP)

(72) Inventors: Takashi Ikeda, Osaka (JP); Masafumi Tanaka, Osaka (JP); Shigekazu Yamagishi, Osaka (JP); Hiroki Sugiyama, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/298,736

(22) Filed: Oct. 20, 2016

(65) Prior Publication Data

US 2017/0227192 A1   Aug. 10, 2017

(30) Foreign Application Priority Data

Feb. 4, 2016   (JP) ................................ 2016-019857
Oct. 5, 2016   (JP) ................................ 2016-197373

(51) Int. Cl.
*F21V 9/16* (2006.01)
*F21V 29/89* (2015.01)
*F21V 13/14* (2006.01)
*G03B 21/20* (2006.01)
*G02B 26/00* (2006.01)
*F21V 7/00* (2006.01)
*G03B 21/00* (2006.01)

(52) U.S. Cl.
CPC .................. *F21V 9/16* (2013.01); *F21V 7/00* (2013.01); *F21V 13/14* (2013.01); *F21V 29/89* (2015.01); *G02B 26/008* (2013.01); *G03B 21/204* (2013.01); *G03B 21/008* (2013.01)

(58) Field of Classification Search
CPC ... F21V 9/16; F21V 7/00; F21V 13/14; F21V 29/89; G02B 26/008; G02B 21/204
See application file for complete search history.

(56) References Cited

U.S. PATENT DOCUMENTS

2013/0286359 A1   10/2013 Motoya et al.

FOREIGN PATENT DOCUMENTS

JP   2013-228598 A   11/2013

*Primary Examiner* — Joseph L Williams
(74) *Attorney, Agent, or Firm* — McDermott Will & Emery LLP (57) ABSTRACT

A phosphor wheel includes: a substrate; a light reflection layer disposed on one surface of the substrate; a phosphor layer; and a bonding layer which is located between and bonds the light reflection layer and the phosphor layer, wherein the bonding layer contains a particle which is higher in thermal conductivity than a base material of the bonding layer and higher in light reflectance than the light reflection layer.

10 Claims, 7 Drawing Sheets

PHOSPHOR WHEEL, LIGHT SOURCE DEVICE, AND PROJECTION IMAGE DISPLAY APPARATUS

CROSS REFERENCE TO RELATED APPLICATION

This application claims the benefit of priorities of Japanese Patent Application Number 2016-019857 filed on Feb. 4, 2016 and Japanese Patent Application Number 2016-197373 filed on Oct. 5, 2016, the entire content of which is hereby incorporated by reference.

BACKGROUND

1. Technical Field

The present disclosure relates to a phosphor wheel used in a light source device included in a projection image display apparatus, for example.

2. Description of the Related Art

Japanese Unexamined Patent Application Publication No. 2013-228598 discloses a phosphor wheel including a titanium oxide layer disposed on a substrate, and a phosphor layer disposed on the titanium oxide layer. Such a phosphor wheel includes a fluorescent light emitter disposed opposite to an excitation light source, and a fluorescence light-emitting plate including a reflection section which contains titanium oxide and is disposed on the opposite side of the excitation light source to be joined to the fluorescent light emitter. When excitation light from the excitation light source is emitted onto the fluorescent light emitter, the fluorescent light emitter converts a wavelength of the excitation light, and the fluorescent light whose wavelength has been converted is reflected off the reflection section.

The reflection section of such a phosphor wheel has a reflectance improved by the titanium oxide, and thus it is possible to increase light use efficiency and reduce its costs.

SUMMARY

The present disclosure provides a phosphor wheel having an improved fluorescent efficiency and improved thermal conductivity.

The phosphor wheel according the present disclosure includes: a substrate; a light reflection layer disposed on one surface of the substrate; a phosphor layer; and a bonding layer which is located between and bonds the light reflection layer and the phosphor layer, wherein the bonding layer contains a particle which is higher in thermal conductivity than a base material of the bonding layer and higher in light reflectance than the light reflection layer.

According to the present disclosure, it is possible to increase the fluorescent efficiency and the thermal conductivity.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF THE EMBODIMENTS

An embodiment shall be described below with reference to the drawings. However, there are instances where excessively detailed description is omitted. For example, there are instances where detailed description of well-known matter and redundant description of substantially identical components are omitted. This is for the purpose of preventing the following description from being unnecessarily redundant and facilitating understanding of those skilled in the art.

It should be noted that the accompanying Drawings and subsequent description are provided to allow a person of ordinary skill in the art to sufficiently understand the present disclosure, and are thus not intended to limit the scope of the subject matter recited in the Claims. In addition, each diagram is a schematic diagram and not necessarily strictly illustrated. In each of the diagrams, substantially the same structural components are assigned with the same reference signs, and there are instances where redundant descriptions are omitted or simplified.

Embodiment 1

[1-1-1. An Overall Configuration of a Phosphor Wheel]

Figure 1:
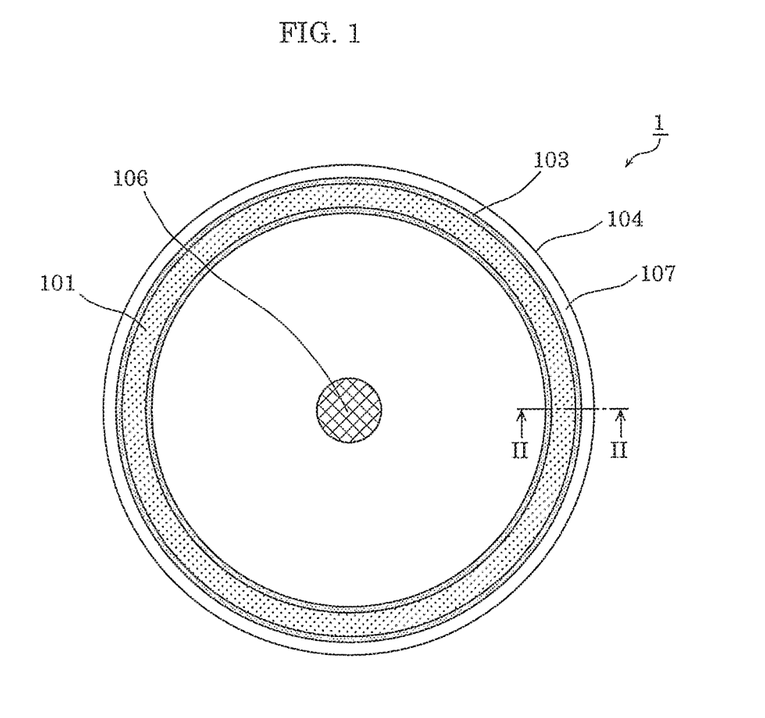
FIG. 1 is a plan view of a phosphor wheel according to Embodiment 1.
Figure 2:
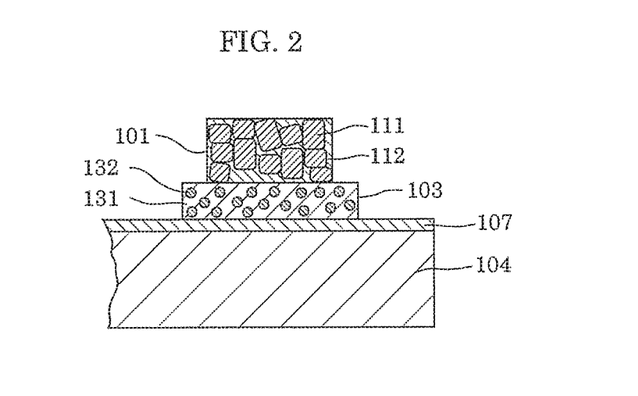
FIG. 2 is a schematic cross-sectional diagram of the phosphor wheel according to Embodiment 1.

The following describes a configuration of a phosphor wheel according to Embodiment 1, with reference to FIG. 1 and FIG. 2. FIG. 1 is a plan view of the phosphor wheel according to Embodiment 1. FIG. 2 is a schematic cross-sectional diagram (a schematic diagram of a cross-section surface taken along the line II-II of FIG. 1) of the phosphor wheel according to Embodiment 1. As illustrated in FIG. 1 and FIG. 2, phosphor wheel 1 according to Embodiment 1 includes substrate 104, light reflection layer 107, phosphor layer 101, bonding layer 103, and motor 106.

Substrate 104 is a discotic plate component rotationally driven by motor 106. A material used for substrate 104 is not specifically limited. For example, substrate 104 is formed using aluminum. Since aluminum is relatively high in thermal conductivity, it is possible to increase heat dissipation performance of substrate 104. In addition, a weight of substrate 104 is reduced by forming substrate 104 using aluminum. The thickness of substrate 104 is, for example, 1.5 mm or less.

In addition, although not illustrated in FIG. 1, as illustrated in FIG. 2, light reflection layer 107 is disposed on at least one surface of substrate 104.

Light reflection layer 107 is, stated differently, an enhanced reflection film for enhancing (increasing) the reflectance of a surface of substrate 104, and has a reflectance higher than the surface (one of the surfaces) of substrate 104. Light reflection layer 107 is formed using silver or a silver alloy, for example. It should be noted that, although not illustrated in detail, light reflection layer 107 includes an undercoat layer and a topcoat layer. Light reflection layer 107 is vapor deposited, for example, on a whole area of one of the surfaces of substrate 104. Light reflection layer 107 may be partially vapor deposited on one of the surfaces of substrate 104.

Bonding layer 103 is located between light reflection layer 107 and phosphor layer 101 in a stacked direction, and bonds light reflection layer 107 and phosphor layer 101 by being directly in contact with each of light reflection layer 107 and phosphor layer 101. Bonding layer 103 is formed on light reflection layer 107 disposed on substrate 104, in a ring shape (annular shape) on a circumference equally distant from a rotation center of phosphor wheel 1. In other words, bonding layer 103 is formed in a belt-like shape along the circumference. In addition, bonding layer 103 is partially formed on light reflection layer 107, instead of being formed on a whole area of light reflection layer 107. As illustrated in FIG. 2, in a plan view (viewed in a direction perpendicular to substrate 104), bonding layer 103 has a same width as phosphor layer 101, or a slightly larger width than phosphor layer 101. Bonding layer 103 is thus in contact with almost the whole area of a lower surface of phosphor layer 101.

Bonding layer 103 includes base material 131. Base material 131 is formed using resin silicon, for example. In bonding layer 103 (base material 131), particle 132 which enhances light reflectance and thermal conductivity of bonding layer 103 is contained. Particle 132 is higher in thermal conductivity than base material 131 of bonding layer 103, and higher in light reflectance than light reflection layer 107.

Phosphor layer 101 (phosphor ring) emits fluorescence when being irradiated with excitation light. Phosphor layer 101 is disposed on bonding layer 103. In a plan view, bonding layer 103 protrudes from both sides of phosphor layer 101 in a width direction. phosphor layer 101 is formed in a ring shape (annular shape) on a circumference equally distant from a rotation center of phosphor wheel 1. In other words, phosphor layer 101 is formed in a belt-like shape along the circumference in a plan view. Phosphor layer 101 is formed in a ring shape in advance, and then fixedly bonded to light reflection layer 107 (substrate 104) by bonding layer 103. Bonding layer 103 is applied by a dispenser, for example, or may be screen printed. How to form bonding layer 103 is not specifically limited.

Phosphor layer 101 includes phosphor particle 111 and binder 112. Phosphor particle 111 is, specifically, a YAG yellow phosphor particle. In phosphor layer 101, phosphor particle 111 which contributes to conversion from excitation light to fluorescence may be included in large amounts, for improving the light conversion efficiency. In other words, a phosphor ratio (phosphor particle content ratio) may be high in phosphor layer 101.

Binder 112 is a mixture included in phosphor layer 101 other than phosphor particle 111. Binder 112 includes an inorganic substance having a high thermal conductivity, such as alumina. The thermal conductivity of alumina is ten times or more of thermal conductivity of resin silicone. It is possible to implement phosphor layer 101 having a high thermal conductivity, by forming phosphor layer 101 to include phosphor particle 111 and binder 112 formed using alumina.

Motor 106 rotationally drives phosphor wheel 1. Motor 106 is, for example, an outer rotor motor, however, motor 106 is not specifically limited.

[1-1-2. A Detailed Configuration of the Bonding Layer]

As described above, resin silicone having bonding function, for example, is used as base material 131 of bonding layer 103. With this configuration, it is possible to alleviate distortion due to a difference in coefficient of thermal expansion between light reflection layer 107 (substrate 104) and phosphor layer 101, and maintain the shape etc., of phosphor wheel 1. In view of the feature of alleviating distortion, dimethyl-based resin silicone may be used as the resin silicone included in bonding layer 103. In addition, dimethyl-based resin silicone is less likely to change in color even in a long-term use, and also has an advantages effect that light transmittance is less likely to decrease.

Meanwhile, resin silicone is low in thermal conductivity. For this reason, in phosphor wheel 1, particle 132 which is higher in thermal conductivity than resin silicone and higher in light reflectance than light reflection layer 107 is contained in the resin silicone which is base material 131. With bonding layer 103 containing particle 132, it is possible to simultaneously implement (i) reduction of distortion due to a difference in the coefficient of thermal expansion between phosphor layer 101 and substrate 104 and (ii) enhancement of thermal conductivity and enhancement of light reflectance.

In this manner, in order to achieve enhancement of reflectance and enhancement of thermal conductivity by particle 132, particle 132 is formed of, for example, titanium oxide, alumina, or a mixture of titanium oxide and alumina. Among titanium oxide, alumina, and the mixture of titanium oxide and alumina, titanium oxide may be selected in terms of the reflectance and the thermal conductivity. In the case where resin silicone is used as base material 131 and particle 132 is formed of titanium oxide, the contained amount of particle 132 may be in a rage approximately from 10% to 20% of the entirety of bonding layer 103, in view of distortion alleviation, reflectance, and thermal conductivity.

Figure 3:
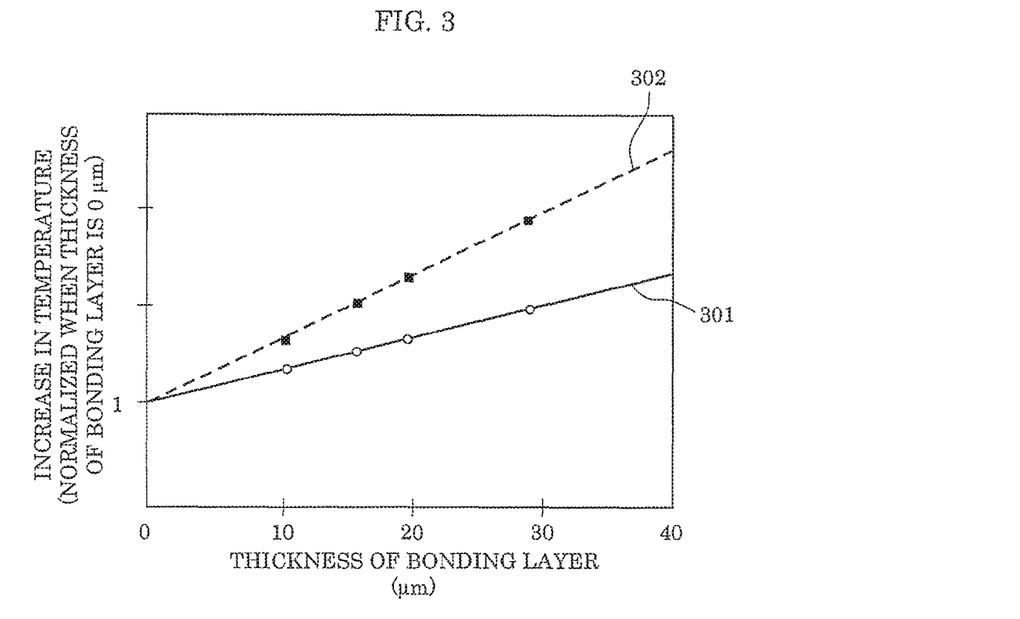
FIG. 3 is a diagram illustrating an effect of a thickness of a bonding layer on a temperature of a phosphor layer.

The thermal resistance decreases with decreasing thickness of bonding layer 103, and thus increase in temperature of phosphor layer 101 is reduced. FIG. 3 is a diagram illustrating an effect of a thickness of bonding layer 103 on a temperature of phosphor layer 101. It should be noted that the temperature of phosphor layer 101 indicated in the vertical axis of FIG. 3 is normalized assuming that the temperature is 1 when the thickness of bonding layer 103 is 0 μm. FIG. 3 indicates a temperature when titanium oxide is used as particle 132.

As described above, the thermal conductivity of particle 132 formed of titanium oxide, alumina, or the like is approximately 10 times or more of the thermal conductivity of resin silicone. For this reason, increase in temperature when the thickness of bonding layer 103 is increased is smaller in the case where particle 132 is contained in bonding layer 103 (graph 301) than in the case where particle 132 is not contained in bonding layer 103 (graph 302).

In phosphor layer 101, a phenomenon referred to as temperature quenching in which light conversion efficiency decreases occurs when the temperature increases. For this reason, the temperature of phosphor layer 101 may be low. In other words, bonding layer 103 may have a less thickness. In view of the upper limit temperature of phosphor wheel 1, based on fluorescence efficiency, etc., the thickness of bonding layer 103 is, for example, 80 μm or less.

Meanwhile, the distortion alleviation and the reflectance enhance with increasing thickness of bonding layer 103. Accordingly, in order to suppress temperature increase of phosphor layer 101, bonding layer 103 may have a less thickness to the extent that the distortion alleviation and the reflectance are ensured. The following describes a thickness of bonding layer 103 necessary for ensuring the distortion alleviation and a thickness of bonding layer 103 necessary for ensuring the reflectance.

First, the thickness of bonding layer 103 necessary for ensuring the distortion alleviation shall be described. The thickness of bonding layer 103 necessary for ensuring the distortion alleviation can be calculated from an amount of distortion caused by mechanical strength properties of substrate 104, bonding layer 103, and phosphor layer 101. Assume that substrate 104 is formed using aluminum, a YAG yellow phosphor particle is used as phosphor particle 111 of phosphor layer 101, and alumina is used as binder 112 of phosphor layer 101. When dimethyl resin silicone is used as base material 131 of bonding layer 103, and particle 132 is formed of titanium oxide, the thickness of bonding layer 103 may be 30 μm or greater. It should be noted that this numerical value is determined in consideration of the result of a reliability test such as a heat cycle test.

Next, the thickness of bonding layer 103 necessary for ensuring the reflectance shall be described. The light conversion efficiency (fluorescent efficiency) of phosphor layer 101 depends on a level of reflectance of an adjacent reflective surface (a surface for reflecting fluorescence which includes bonding layer 103, light reflection layer 107, and substrate 104). The reason is that the reflective surface, by reflecting excitation light which does not enter (does not contribute to fluorescence conversion) phosphor particle 111, allows the excitation light to enter phosphor particle 111 in phosphor layer 101, thereby increasing fluorescence output.

Fluorescent emitted from phosphor particle 111 is emitted in all directions. Accordingly, it is possible to increase the fluorescence output by fluorescence being reflected on a reflective surface. In such a manner, the fluorescence output increases with increasing reflectance of the reflective surface. The reflectance of the reflective surface is determined by a reflectance property of each of bonding layer 103 and light reflection layer 107.

Figure 4:
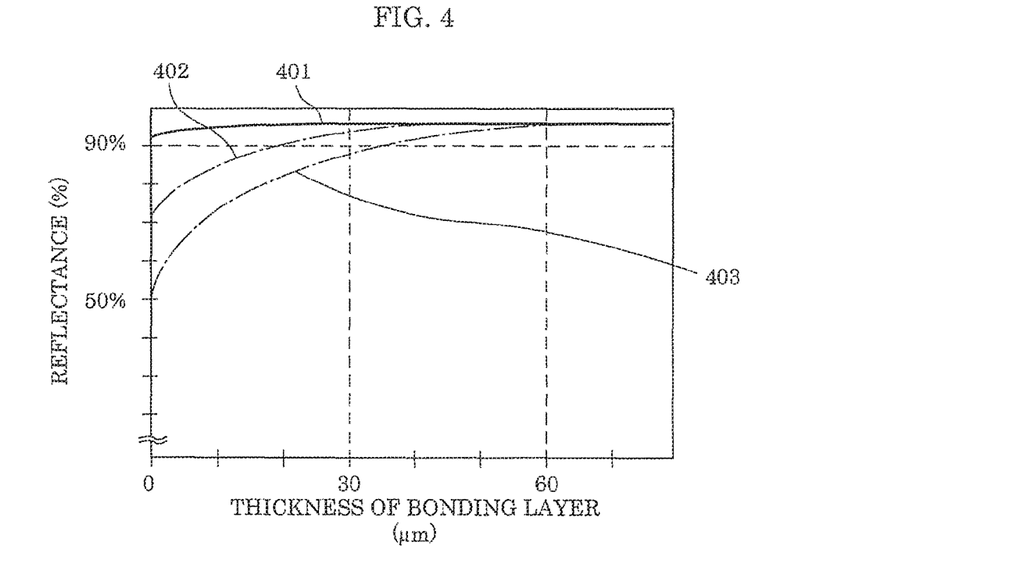
FIG. 4 is a diagram illustrating a change in reflectance of a reflective surface when the thickness of the bonding layer is changed, for each of light reflection layers of three types having different reflectances.

Here, the relationship between the thickness of bonding layer 103 and the reflectance of the reflective surface shall be described. FIG. 4 is a diagram illustrating a relationship between the thickness of bonding layer 103 and the reflectance of the reflective surface. FIG. 4 is a diagram illustrating a change in the reflectance of the reflective surface when the thickness of bonding layer 103 is changed, for each of light reflection layers 107 of three types having different reflectances. In bonding layer 103, dimethyl silicone is used as base material 131, and an adhesive including titanium oxide content of 10% or more and 15% or less in weight is used as particle 132.

In FIG. 4, assuming that the thickness of bonding layer 103 is 0 μm in the case where bonding layer 103 is not included, graph 401 indicates changes when the reflectance of light reflection layer 107 is 90%, graph 402 indicates changes when the reflectance of light reflection layer 107 is 70%, and graph 403 indicates changes when the reflectance of light reflection layer 107 is 50%.

As illustrated in graph 401, graph 402, and graph 403, regardless of the reflectance of light reflection layer 107, the reflectance of the reflective surface saturates when the thickness of bonding layer 103 shows a predetermined value or more. More specifically, the reflectance of reflective surface saturates and is constant, regardless of the reflectance of light reflection layer 107 (reflectance of substrate 104), when the thickness of bonding layer 103 is 60 μm or more. However, the reflectance saturates with a reduced thickness of bonding layer 103, as the reflectance of light reflection layer 107 increases. In FIG. 4, in the case where the reflectance of light reflection layer 107 is greater than 90%, the reflectance of the reflective surface saturates when the thickness of bonding layer 103 is 30 μm or more.

As described above, in order to enhance the reflectance of the reflective surface and reduce the thickness of bonding layer 103, the reflectance of substrate 104 (light reflection layer 107) may be 90% or greater. As a material of substrate 104, aluminum or an aluminum alloy may be used in consideration of lightness necessary for maintaining rigidity, thermal conductivity, and rotational performance as a phosphor wheel. However, it is difficult to obtain the reflectance of 90% or greater with only aluminum or an aluminum alloy.

In view of the above, phosphor wheel 1 includes light reflection layer 107 formed using silver or a silver alloy on the surface of substrate 104 formed using aluminum, to obtain the reflectance of 90% or greater of the reflective surface. Other than the above-described example, an aluminum film, a dielectric multi-layer film, etc., may be used as light reflection layer 107.

As described above, phosphor wheel 1 may be formed, for example, as described below.

Light reflection layer 107 disposed on the surface of substrate 104 may have a reflectance of 90% or greater.

Bonding layer 103 may include at least particle 132 formed of titanium oxide.

The thickness of bonding layer 103 may be ranging from 30 μm to 80 μm inclusive, for ensuring reliability (distortion alleviation) and fluorescent efficiency.

[1-1-3. Advantageous Effects, Etc.]

As described above, phosphor wheel 1 includes: substrate 104; light reflection layer 107 disposed on one surface of substrate 104; phosphor layer 101; and bonding layer 103 which is disposed between and bonds light reflection layer 107 and phosphor layer 101. Bonding layer 103 contains particle 132 which is higher in thermal conductivity than base material 131 of bonding layer 103 and higher in light reflectance than light reflection layer 107.

In this manner, bonding layer 103 includes particle 132, thereby enhancing fluorescent efficiency and thermal conductivity of phosphor wheel 1.

In addition, for example, light reflection layer 107 includes a silver alloy, and has a light reflectance of 90% or greater.

In this manner, it is possible to increase reflection of fluorescence emitted from phosphor layer 101.

In addition, for example, bonding layer 103 has a thickness ranging from 30 μm to 80 μm inclusive.

In this manner, it is possible to ensure reliability (distortion alleviation) and fluorescent efficiency of phosphor wheel 1.

In addition, for example, particle 132 contained in bonding layer 103 is formed of titanium oxide.

In this manner, it is possible, with particle 132 formed of titanium oxide, to enhance fluorescent efficiency and thermal conductivity of phosphor wheel 1.

In addition, for example, particle 132 contained in bonding layer 103 is formed of alumina.

In this manner, it is possible, with particle 132 formed of alumina, to enhance fluorescent efficiency and thermal conductivity of phosphor wheel 1.

In addition, for example, particle 132 contained in bonding layer 103 comprises a particle formed of titanium oxide and a particle formed of alumina.

In this manner, it is possible, with a mixture of particle 132 formed of titanium oxide and particle 132 formed of alumina in bonding layer 103, to enhance fluorescent efficiency and thermal conductivity of phosphor wheel 1.

In addition, for example, substrate 104 has a discotic shape, and phosphor layer 101 and bonding layer 103 are each formed in a belt-like shape along a circumference of substrate 104.

In this manner, since phosphor layer 101 and bonding layer 103 are disposed selectively in a necessary region in light reflection layer 107, it is possible to reduce component costs of phosphor layer 101 and bonding layer 103.

In addition, a method of manufacturing phosphor wheel 1 includes: disposing light reflection layer 107 on one surface of substrate 104; forming phosphor layer 101; disposing bonding layer 103 on light reflection layer 107; and fixedly bonding phosphor layer 101 which has been formed, to light reflection layer 107, by mounting phosphor layer 101 which has been formed, on bonding layer 103, wherein bonding layer 103 contains a particle which is higher in thermal conductivity than a base material of bonding layer 103 and higher in light reflectance than light reflection layer 107.

In this manner, it is possible to manufacture phosphor wheel 1 having enhanced fluorescent efficiency and thermal conductivity.

[1-2-1. A Light Source Device Including a Phosphor Wheel]

Figure 5:
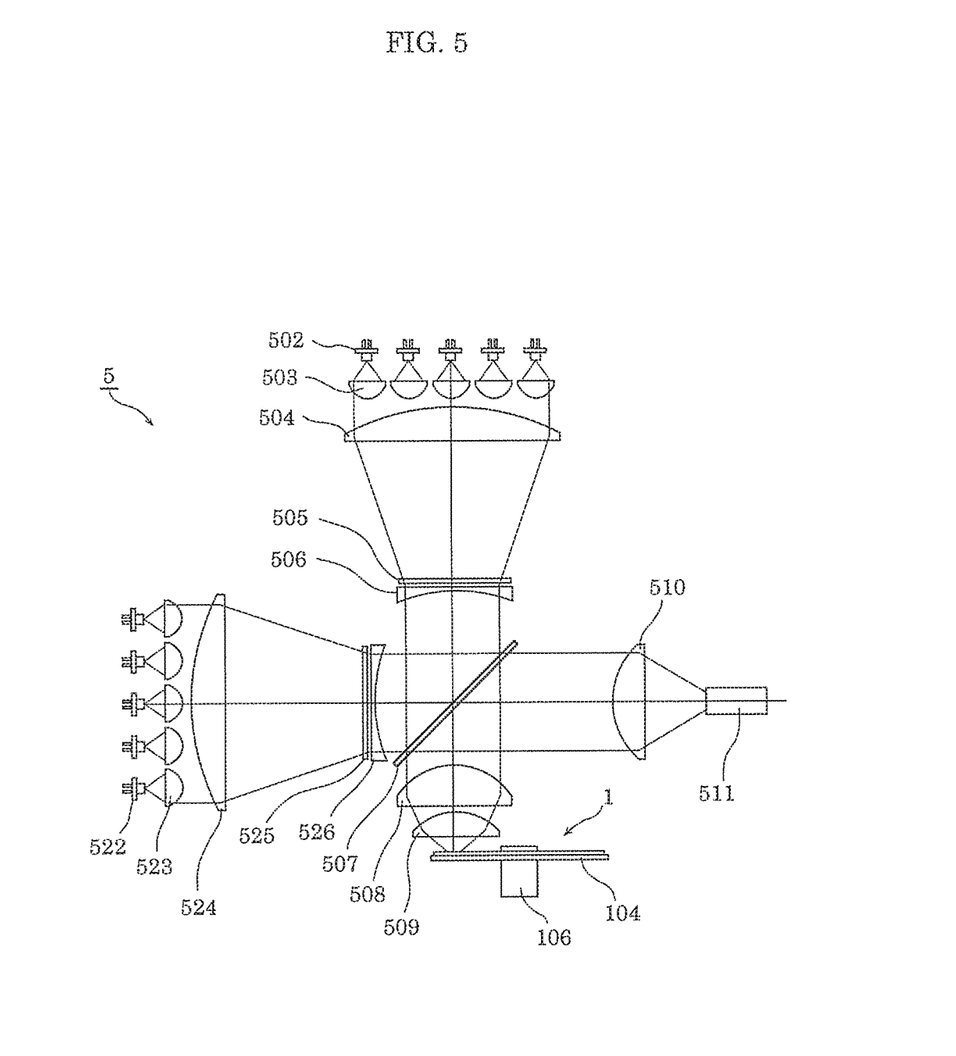
FIG. 5 is a diagram illustrating a configuration of a light source device according to Embodiment 1.

Next, a light source device according to Embodiment 1 shall be described with reference to FIG. 5. FIG. 5 is a diagram illustrating a configuration of a light source device according to Embodiment 1.

As illustrated in FIG. 5, light source device 5 according to Embodiment 1 includes phosphor wheel 1 and a plurality of first lasers 502. The plurality of first lasers 502 exemplify an excitation light source.

In addition, light source device 5 includes: a plurality of collimator lenses 503; convex lens 504; diffuser 505; concave lens 506; dichroic mirror 507; convex lens 508; and convex lens 509. These optical components exemplify an optical system for guiding light emitted from first lasers 502 to phosphor wheel 1. In addition, light source device 5 includes: a plurality of second lasers 522; a plurality of collimator lenses 523; convex lens 524; diffuser 525; convex lens 510; and rod integrator 511.

Light emitted from each of first lasers 502 is collimated by collimator lenses 503 disposed on a light exit side of first lasers 502. Convex lens 504 which reduces a luminous flux width by combining light of first lasers 502 emitted from collimator lenses 503 is disposed on the light exit side of collimator lenses 503. Light having the luminous flux width reduced by convex lens 504 enters diffuser 505 disposed on a light exit side of convex lens 504. Diffuser 505 reduces ununiformity of the luminous flux which was not resolved by convex lens 504.

Light emitted from diffuser 505 enters concave lens 506. Light which passed through diffuser 505 and enters concave lens 506 is collimated by concave lens 506.

The light collimated by and emitted from concave lens 506 enters dichroic mirror 507 disposed on a light exit side of concave lens 506. Dichroic mirror 507 is disposed at an angle of 45 degrees with respect to the optical axis, and has a feature of transmitting light in a wavelength region of light emitted from first lasers 502, and reflecting light in a wavelength region of fluorescence emitted from phosphor wheel 1. Accordingly, the light emitted from concave lens 506 and enters dichroic mirror 507 is transmitted through dichroic mirror 507, and enters convex lens 508 and convex lens 509 in this order, to enter phosphor wheel 1 with the luminous flux being converged.

Phosphor wheel 1 is disposed in such a manner that phosphor layer 101 faces convex lens 509. The light of first lasers 502 converged by convex lens 508 and convex lens 509 is radiated as excitation light for exciting phosphor particle 111 in phosphor layer 101. As described above, phosphor layer 101 included in phosphor wheel 1 has a ring shape. Since phosphor wheel 1 is rotated by motor 106, excitation light is prevented from being intensively radiated to one point of phosphor layer 101.

A wavelength of the excitation light emitted from first lasers 502 and enters phosphor layer 101 is converted. More specifically, the excitation light from first lasers 502 is converted to fluorescence in a different wavelength range from the excitation light. Furthermore, a travelling direction of the fluorescence emitted from phosphor layer 101 is changed by 180 degrees with respect to light which enters phosphor layer 101. In other words, the fluorescence is emitted toward convex lens 509. The fluorescence entered convex lens 509 enters convex lens 508, is collimated, and enters dichroic mirror 507.

Dichroic mirror 507 is, as described above, disposed at an angle of 45 degrees with respect to the optical axis of the fluorescence. In addition, dichroic mirror 507 has a feature of transmitting light in a wavelength region of the light emitted from first laser 502, and reflecting light in a wavelength region of the fluorescence emitted from phosphor layer 101 (phosphor wheel 1). Accordingly, the fluorescence entered dichroic mirror 507 is reflected and the travelling direction of the fluorescence is changed by 90 degrees.

Light emitted from each of second lasers 522 is collimated by collimator lenses 523 disposed on a light exit side of second lasers 522. Convex lens 524 which reduces a luminous flux width by combining light of second lasers 522 emitted from collimator lenses 523 is disposed on a light exit side of collimator lenses 523. Light having the luminous flux width reduced by convex lens 524 enters diffuser 525 disposed on a light exit side of convex lens 524. Diffuser 525 reduces ununiformity of the luminous flux which was not resolved by convex lens 524.

Light emitted from diffuser 525 enters concave lens 526. Concave lens 526 collimates light which passed through diffuser 525 and enters concave lens 526.

The light collimated by and emitted from concave lens 526 enters dichroic mirror 507 disposed on a light exit side of concave lens 526, in a direction different by 90 degrees from the fluorescence emitted from phosphor wheel 1. As described above, dichroic mirror 507 has a feature of transmitting light in a wavelength region of light emitted from second lasers 522. The light entered dichroic mirror 507 from concave lens 526 is transmitted through dichroic mirror 507. As a result, the fluorescence emitted from phosphor wheel 1 and the light emitted from second lasers 522 are emitted in the same direction.

The fluorescence emitted from phosphor wheel 1 and the light emitted from second lasers 522 are converged by convex lens 510 and enter rod integrator 511. Rod integrator 511 is an example of a component for homogenizing light, and an intensity distribution of light emitted by rod integrator 511 is homogenized.

It should be noted that the light emitted by second lasers 522 is light in a blue wavelength region, and the light emitted by first lasers 502 is light in a range from an ultraviolet wavelength region to the blue wavelength region. Phosphor wheel 1 is excited by light (excitation light) emitted by first lasers 502, and emits yellow fluorescence including wavelength regions of both green and red. Accordingly, rod integrator 511 emits white light of which the intensity distribution is homogenized.

[1-2-2. Advantageous Effects, Etc.]

As described above, light source device 5 includes: phosphor wheel 1; first lasers 502; and an optical system for guiding light emitted from first lasers 502 to phosphor wheel 1. First lasers 502 exemplify an excitation light source.

With such light source device 5, it is possible to enhance the fluorescent efficiency and the thermal conductivity of phosphor wheel 1.

[1-3-1. A Projection Image Display Apparatus which Includes the Light Source Device]

Figure 6:
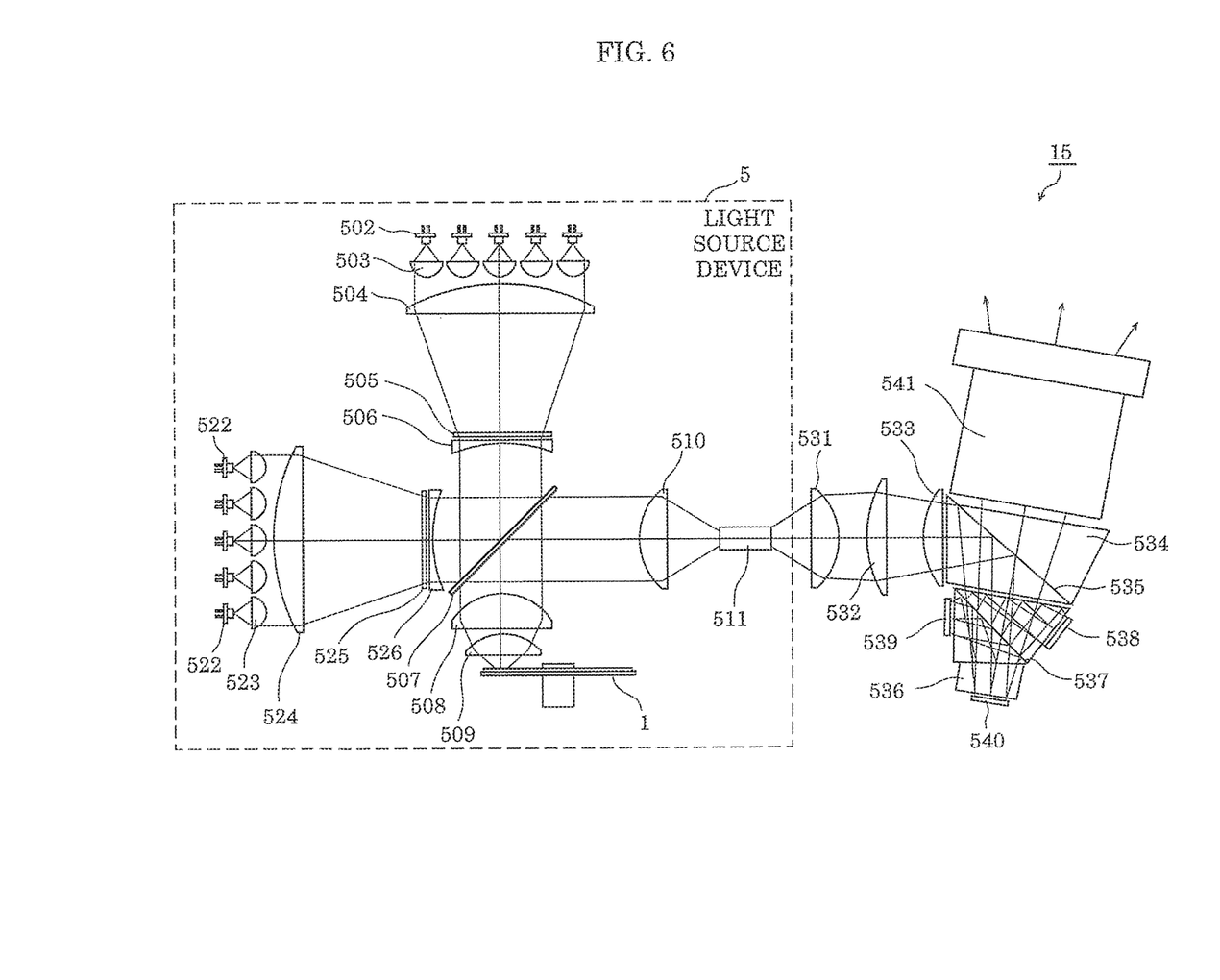
FIG. 6 is a diagram illustrating a configuration of a projection image display apparatus according to Embodiment 1.

Next, a projection image display apparatus according to Embodiment 1 shall be described with reference to FIG. 6. FIG. 6 is a diagram illustrating a configuration of a projection image display apparatus according to Embodiment 1.

As illustrated in FIG. 6, projection image display apparatus 15 includes the above-described light source device 5. In addition, projection image display apparatus 15 includes: convex lens 531; convex lens 532; convex lens 533; total internal reflection prism 534; color prism 536; digital micromirror device (DMD) 538; DMD 539; DMD 540; and projection lens 541.

It should be noted that, in the following description, details of light source device 5 shall be omitted, and behavior of white light emitted from rod integrator 511 shall be described.

The white light emitted from rod integrator 511 is mapped to each of DMD 538, DMD 539, and DMD 540 described below, by a relay lens system including three convex lenses of convex lens 531, convex lens 532, and convex lens 533.

The light transmitted through convex lens 531, convex lens 532, and convex lens 533 which are included in the relay lens system enters total internal reflection prism 534. Total internal reflection prism 534 includes two glass blocks, and narrow gap 535 is defined between the two glass blocks. The light entered total internal reflection prism 534 is reflected at narrow gap 535 and enters color prism 536.

Color prism 536 includes three glass blocks of a first glass block, a second glass block, and a third glass block. The first glass block is a glass block disposed facing DMD 538, the second glass block is a glass block disposed facing DMD 539, and the third glass block is a glass block disposed facing DMD 540.

Narrow gap 537 is defined between the first glass block and the second glass block. In addition, color prism 536 includes a dichroic surface which reflects light in a blue wavelength region, on a first glass block side between the first glass block and the second glass block.

The light in the blue wavelength region of the white light entered color prism 536 from total internal reflection prism 534 is reflected off the above-described dichroic surface, is totally reflected off the gap defined between color prism 536 and total internal reflection prism 534 to have a changed travelling direction, and enters DMD 538 for a blue color.

Meanwhile, the light which passes through narrow gap 537 and enters the second glass block becomes yellow light including light in both of the red wavelength region and the green wavelength region. The yellow light enters the dichroic surface disposed at the interface between the second glass block and the third glass block of color prism 536. The dichroic surface has a feature of reflecting light in the red wavelength region (hereinafter also referred to as red light) and transmitting light in the green wavelength region (hereinafter also referred to as green light). Accordingly, the yellow light is divided into red light and green light on the above-described dichroic surface. More specifically, the red light in the yellow light is reflected off the dichroic surface, and the green light is transmitted through the dichroic surface to enter the third glass block.

The red light reflected off the dichroic surface is totally reflected by entering narrow gap 537 at an angle greater than or equal to a critical angle, and enters DMD 539 for red.

The green light entered the third glass block travels straight, and enters DMD 540 for green.

Each of DMD 538, DMD 539, and DMD 540 are driven by an image circuit which is not illustrated, and each pixel is switched between on and off according to image information. In this manner, the reflection direction of light entered each of the pixels of DMD 538, DMD 539, and DMD 540 is changed for each of the pixels.

The light reflected by a pixel in the ON state in each of DMD 538, DMD 539, and DMD 540 travels reversely the above-described path, is combined by color prism 536 to be white light, and enters total internal reflection prism 534. The light entered total internal reflection prism 534 enters narrow gap 535 at an angle smaller than the critical angle, and is transmitted through narrow gap 535 as it is. The light transmitted through narrow gap 535 is enlarged and projected by projection lens 541 onto a screen which is not illustrated.

[1-3-2. Advantageous Effects, Etc.]

As described above, projection image display apparatus 15 includes light source device 5. With such projection image display apparatus 15, it is possible to enhance the fluorescent efficiency and the thermal conductivity of phosphor wheel 1.

Embodiment 2

[2-1-1. A Configuration of a Phosphor Wheel]

Figure 7:
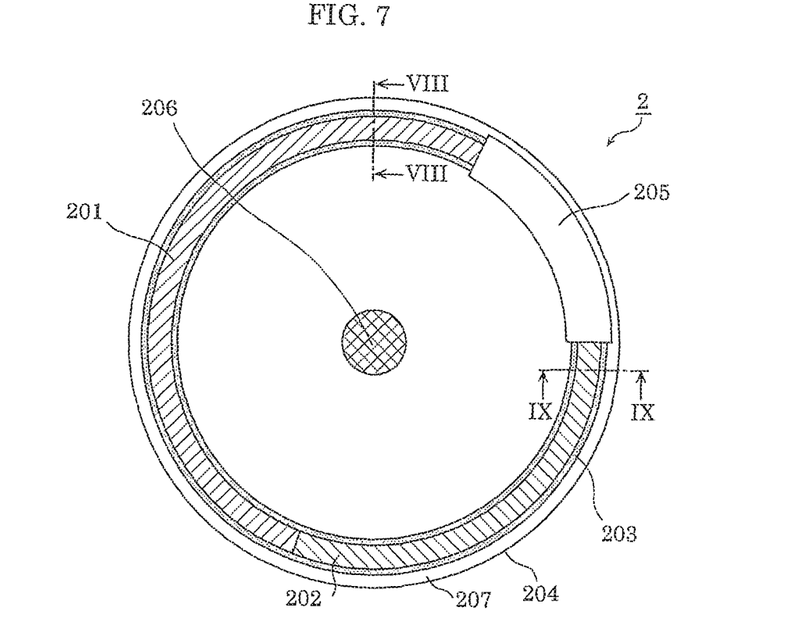
FIG. 7 is a plan view of a phosphor wheel according to Embodiment 2.
Figure 8:
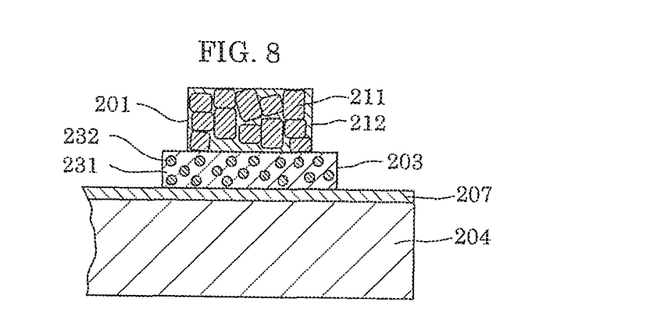
FIG. 8 is a schematic cross-sectional diagram of a first phosphor layer of the phosphor wheel according to Embodiment 2.
Figure 9:
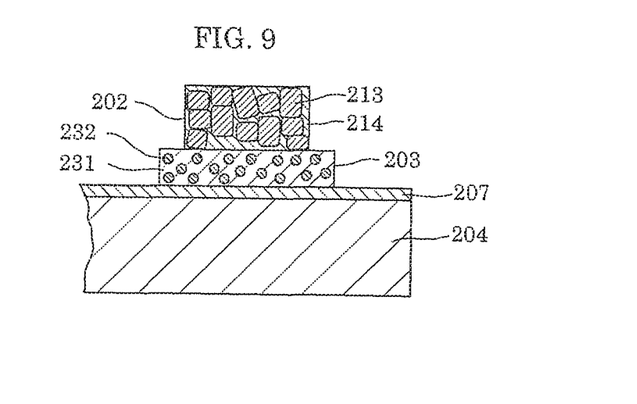
FIG. 9 is a schematic cross-sectional diagram of a second phosphor layer of the phosphor wheel according to Embodiment 2.

The following describes a configuration of a phosphor wheel according to Embodiment 2, with reference to FIG. 7 to FIG. 9. FIG. 7 is a plan view of the phosphor wheel according to Embodiment 2. FIG. 8 is a schematic cross-sectional diagram (a schematic diagram of a cross-section surface taken along the line VIII-VIII of FIG. 7) of a first phosphor layer of the phosphor wheel according to Embodiment 2. FIG. 9 is a schematic cross-sectional diagram (a schematic diagram of a cross-section surface taken along the line IX-IX of FIG. 7) of a second phosphor layer of the phosphor wheel according to Embodiment 2.

As illustrated in FIG. 7 to FIG. 9, phosphor wheel 2 according to Embodiment 2 includes substrate 204, light reflection layer 207, first phosphor layer 201, second phosphor layer 202, bonding layer 203, aperture 205, and motor 206.

Substrate 204 is a discotic plate component rotationally driven by motor 206. A material used for substrate 204 is not specifically limited. For example, substrate 204 is formed using aluminum. Since aluminum is relatively high in thermal conductivity, it is possible to increase heat dissipation performance of substrate 204. In addition, a weight of substrate 204 is reduced by forming substrate 204 using aluminum. As illustrated in FIG. 7, aperture 205 (through-hole) is defined in substrate 204. In addition, although not illustrated in FIG. 8 and FIG. 9, light reflection layer 207 is disposed on at least one of surfaces of substrate 204.

Light reflection layer 207 is, stated differently, an enhanced reflection film for enhancing (increasing) the reflectance of a surface of substrate 204, and has a reflectance higher than a reflectance of the surface of substrate 204. Light reflection layer 207 is formed using silver or a silver alloy, for example. It should be noted that, although not illustrated in detail, light reflection layer 207 includes an undercoat layer and a topcoat layer.

Bonding layer 203 bonds light reflection layer 207 and first phosphor layer 201. Bonding layer 203 also bonds light reflection layer 207 and second phosphor layer 202. Bonding layer 203 is formed on light reflection layer 207 disposed on substrate 204, on a circumference equally distant from a rotation center of phosphor wheel 2. Aperture 205 in substrate 204 and bonding layer 203 are formed to have a ring shape when combined. Bonding layer 203 includes base material 231. Base material 231 is formed using resin silicon, for example. In bonding layer 203 (base material 231), particle 232 which enhances light reflectance and thermal conductivity of bonding layer 203 is contained. Particle 232 is higher in thermal conductivity than base material 231 of bonding layer 203, and higher in light reflectance than light reflection layer 207.

First phosphor layer 201 and second phosphor layer 202 emit fluorescence when irradiated with excitation light. First phosphor layer 201 and second phosphor layer 202 are each formed inside bonding layer 203 in a plan view on the circumference equally distant from the rotation center of phosphor wheel 2, into a partial ring shape (arc-like shape). In other words, first phosphor layer 201 and second phosphor layer 202 are each formed in a belt-like shape along the circumference.

As illustrated in FIG. 8, first phosphor layer 201 includes phosphor particle 211 and first binder 212. As illustrated in FIG. 9, second phosphor layer 202 includes phosphor particle 213 and second binder 214.

Phosphor particle 211 and phosphor particle 213 are different from each other. Phosphor particle 211 is, for example, a yellow phosphor particle, and phosphor particle 213 is, for example, a green phosphor particle.

First binder 212 and second binder 214 are formed using an inorganic substance such as alumina. First binder 212 and second binder 214 may be formed using different materials, or may be formed using the same material.

For the same reason as described in Embodiment 1, phosphor wheel 2 may be formed, for example, as described below.

Light reflection layer 207 disposed on the surface of substrate 204 may have a reflectance of 90% or greater.

Bonding layer 203 may include at least particle 232 formed of titanium oxide.

The thickness of bonding layer 203 may be ranging from 30 μm to 80 μm inclusive.

[2-1-2. Advantageous Effects, Etc.]

As described above, phosphor wheel 2 includes bonding layer 203 containing particle 232 as with phosphor wheel 1, and thus has enhanced fluorescent efficiency and thermal conductivity.

It should be noted that the number of segments of the phosphor layer is not limited to two. One segment or three or more segments may be employed. In addition, aperture 205 need not be defined in substrate 204, or two or more apertures 205 may be defined.

[2-2-1. A Light Source Device Including a Phosphor Wheel]

Figure 10:
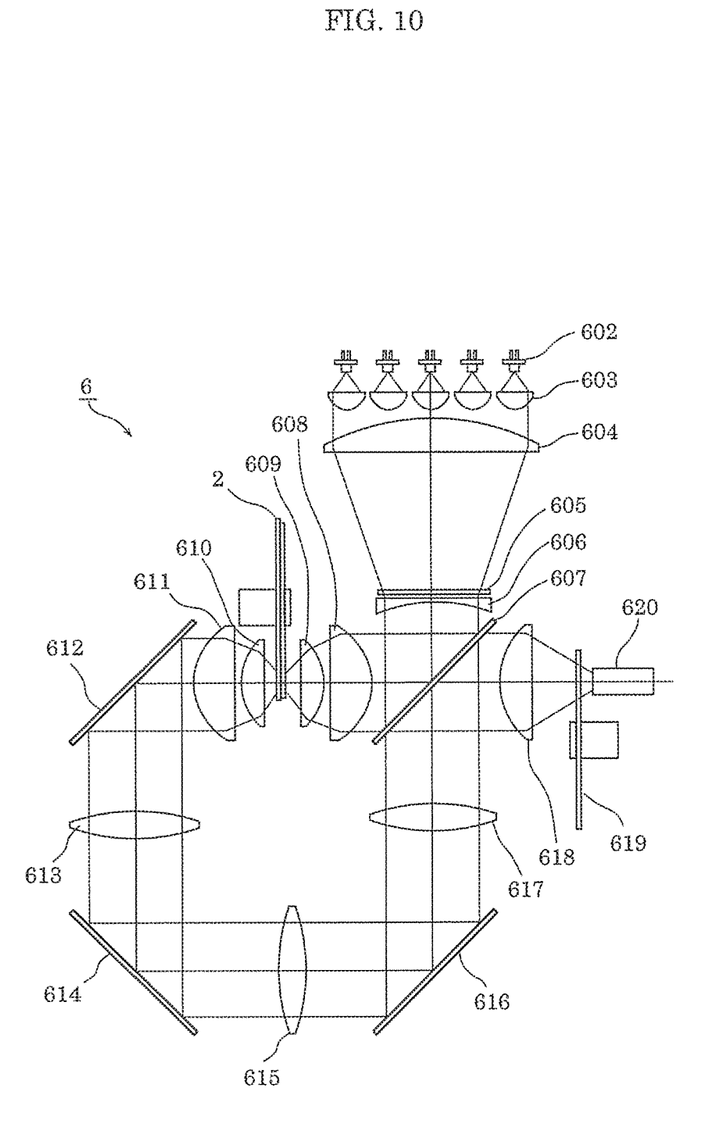
FIG. 10 is a diagram illustrating a configuration of a light source device according to Embodiment 2.

Next, a light source device according to Embodiment 2 shall be described with reference to FIG. 10. FIG. 10 is a diagram illustrating a configuration of a light source device according to Embodiment 2.

As illustrated in FIG. 10, light source device 6 according to Embodiment 2 includes phosphor wheel 2 and a plurality of lasers 602. Lasers 602 exemplify an excitation light source.

In addition, light source device 6 includes: a plurality of collimator lenses 603; convex lens 604; diffuser 605; concave lens 606; dichroic mirror 607; convex lens 608; and convex lens 609. These optical components exemplify an optical system for guiding light emitted from laser 602 to phosphor wheel 2. In addition, light source device 6 includes: convex lens 610; convex lens 611; mirror 612; lens 613; mirror 614; lens 615; mirror 616; lens 617; convex lens 618; color wheel 619; and rod integrator 620.

Light emitted from each of lasers 602 is collimated by collimator lenses 603 disposed on a light exit side of lasers 602. Convex lens 604 which reduces a luminous flux width by combining light of lasers 602 emitted from collimator lenses 603 is disposed on a light exit side of collimator lenses 603. Light having the luminous flux width reduced by convex lens 604 enters diffuser 605 disposed on a light exit side of convex lens 604. Diffuser 605 reduces ununiformity of the luminous flux which was not resolved by convex lens 604. The following describes an example in which lasers 602 emit light in a blue wavelength region.

Light emitted from diffuser 605 enters concave lens 606. Concave lens 606 collimates light which enters concave lens 606 from diffuser 605.

The light collimated by and emitted from concave lens 606 enters dichroic mirror 607 disposed on a light exit side of concave lens 606. Dichroic mirror 607 is disposed at an angle of 45 degrees with respect to the optical axis, and has a feature of reflecting light in a wavelength region of light emitted from first lasers 602, and transmitting light in a wavelength region of florescence emitted from phosphor wheel 2. Accordingly, the light emitted from concave lens 606 and enters dichroic mirror 607 is reflected off dichroic mirror 607, and enters convex lens 608 and convex lens 609 in this order, to enter phosphor wheel 2 with the luminous flux being converged.

Phosphor wheel 2 is disposed in such a manner that any of first phosphor layer 201, second phosphor layer 202, and aperture 205 faces convex lens 609. When phosphor wheel 2 is rotated by motor 206, first phosphor layer 201, second phosphor layer 202, and aperture 205 sequentially pass a position facing convex lens 609. More specifically, when phosphor wheel 2 is rotated, light of lasers 602 which is converged by convex lens 608 and convex lens 609 is emitted to first phosphor layer 201, second phosphor layer 202, and aperture 205 in time series.

First, the case where light of lasers 602 is emitted to first phosphor layer 201 shall be described. Light of lasers 602 entered first phosphor layer 201 is wavelength-converted into first fluorescence, and emitted to convex lens 609. First fluorescence is different from the light of lasers 602, and is, for example, yellow light (light in the red wavelength region and the green wavelength region). First fluorescence entered convex lens 609 enters convex lens 608, is collimated, and enters dichroic mirror 607.

Next, the case where light of lasers 602 is emitted to second phosphor layer 202 shall be described. Light of lasers 602 entered second phosphor layer 202 is wavelength-converted into second fluorescence, and emitted to convex lens 609. Second fluorescence is different from either the light of lasers 602 or the first fluorescence, and is, for example, green light (light in the green wavelength region). Second fluorescence entered convex lens 609 enters convex lens 608, is collimated, and enters dichroic mirror 607.

Lastly, the case where light of lasers 602 is emitted to first aperture 205 shall be described. Light of lasers 602 passed through aperture 205 enters convex lens 610 and convex lens 611 in this order, and is collimated.

A travelling direction of the light collimated by and emitted from convex lens 611 is changed by a relay optical system including three mirrors 612, 614, and 616, and three lenses 613, 615, and 617. Then the light is collimated again and enter dichroic mirror 607. This light (light of lasers 602) enters dichroic mirror 607 at an angle different by 90 degrees from angles of first fluorescence and second fluorescence.

In this manner, first fluorescence, second fluorescence, and light of lasers 602 enter dichroic mirror 607 in time series. As described above, dichroic mirror 607 has a feature of reflecting light of lasers 602 and transmitting first fluorescence and second fluorescence. For that reason, the light of lasers 602 is reflected off dichroic mirror 607 to change the traveling direction by 90 degrees, and enters convex lens 618 by which the luminous flux is converged. First fluorescence and second fluorescence are transmitted through dichroic mirror 607, and enter convex lens 618 by which the luminous flux is converged. Yellow light that is the first fluorescence, green light that is the second fluorescence, and blue light of lasers 602 are sequentially emitted from convex lens 618 and enter color wheel 619.

Color wheel 619 includes a first region which transmits light and a second region which selectively transmits only red light. Color wheel 619 is rotated in such manner that the above-described second region faces convex lens 618 for at least part of a period in which the first fluorescence enters color wheel 619. In this manner, the first fluorescence is converted into red light by color wheel 619. It should be noted that such control on phosphor wheel 2 and color wheel 619 are carried out by a synchronization circuit and a wheel drive circuit which are not illustrated.

Accordingly, color wheel 619 sequentially emits red light, green light, and blue light, and emitted red light, green light, and blue light enter rod integrator 620. Rod integrator 620 is an example of a component for homogenizing light.

[2-2-2. Advantageous Effects, Etc.]

As described above, light source device 6 includes: phosphor wheel 2; lasers 602; and an optical system for guiding light emitted from lasers 602 to phosphor wheel 2. Lasers 602 exemplify an excitation light source.

With such light source device 6, it is possible to enhance the fluorescent efficiency and the thermal conductivity of phosphor wheel 1.

It should be noted that the configuration of a light source which sequentially emits red light, green light, and blue light is not limited to the configuration of light source device 6. For example, phosphor particle 211 contained in first phosphor layer 201 may be a red phosphor particle. In other words, the first fluorescence may be red light, and color wheel 619 may be omitted in this case.

In addition, the number of segments of the phosphor layer is not limited to two. One segment or three or more segments may be employed.

For example, light source device 6 may include phosphor wheel 2 in which second phosphor layer 202 is replaced with first phosphor layer 201. The number of segments of the phosphor layer is one in such phosphor wheel 2. However, since color wheel 619 has the region which transmits red light and the region which transmits green light, red light, green light, and blue light are sequentially emitted.

In addition, the light emitted by lasers 602 may be ultraviolet light instead of blue light. In this case, third phosphor layer which is excited by ultraviolet light and emits blue light may be disposed in place of aperture 205 in phosphor wheel 2. The third phosphor layer contains a blue phosphor particle, and thus emits blue light. In such phosphor wheel 2, the number of segments of the phosphor layer is three.

In addition, an aperture may further be defined at an interface between first phosphor layer 201 and second phosphor layer 202 to prevent first phosphor layer 201 and second phosphor layer 202 from being placed adjacently.

[2-3-1. A Projection Image Display Apparatus which Includes the Light Source Device]

Figure 11:
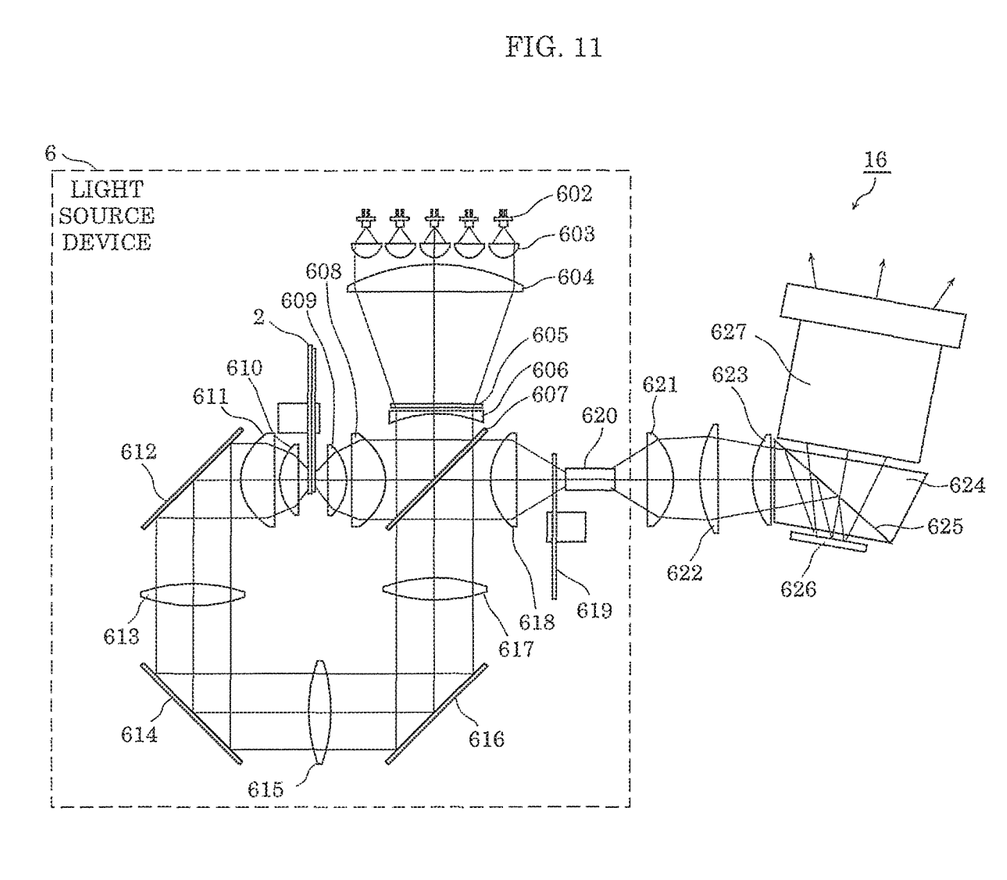
FIG. 11 is a diagram illustrating a configuration of a projection image display apparatus according to Embodiment 2.

Next, a projection image display apparatus according to Embodiment 2 shall be described with reference to FIG. 11. FIG. 11 is a diagram illustrating a configuration of a projection image display apparatus according to Embodiment 2.

As illustrated in FIG. 11, projection image display apparatus 16 includes the above-described light source device 6. Projection image display apparatus 16 further includes convex lens 621, convex lens 622, convex lens 623, total internal reflection prism 624, DMD 626, and projection lens 627.

It should be noted that, in the following description, details of light source device 6 shall be omitted, and behavior of light emitted from rod integrator 620 shall be described.

White light emitted from rod integrator 620 is mapped to DMD 626 which will be described later, by a relay lens system including three convex lenses of convex lens 621, convex lens 622, and convex lens 623.

The light transmitted through convex lens 621, convex lens 622, and convex lens 623 which are included in the relay lens system enters total internal reflection prism 624. Total internal reflection prism 624 includes two glass blocks, and narrow gap 625 is defined between the two glass blocks. The light entered total internal reflection prism 624 enters narrow gap 625 at an incident angle greater than or equal to a critical angle, is thereby totally reflected, and enters DMD 626.

A not-illustrated circuit supplies DMD 626 with an image signal synchronized with phosphor wheel 2 and color wheel 619, and switching between on and off of each pixel is performed according to the supplied image signal (image information). In this manner, the reflection direction of the light entered DMD 626 changes for each of the pixels.

The light reflected off DMD 626 by a pixel in an ON state enters total internal reflection prism 624. The light entered total internal reflection prism 624 enters narrow gap 625 at an angle smaller than the critical angle, and is transmitted through narrow gap 625 as it is. The light transmitted through narrow gap 625 is enlarged and projected by projection lens 627 onto a screen which is not illustrated.

[2-3-2. Advantageous Effects, Etc.]

As described above, projection image display apparatus 16 includes light source device 6. With such projection image display apparatus 16, it is possible to enhance the fluorescent efficiency and the thermal conductivity of phosphor wheel 2.

(Conclusion)

As described above, Embodiments 1 and 2 are described as exemplifications of the technique disclosed in the present application However, the technique according to the present disclosure is not limited to the foregoing embodiments, and can also be applied to embodiments to which a modification, substitution, addition, or omission is executed as necessary. Furthermore, a new embodiment can be formed by combining the respective structural components described in the foregoing Embodiments 1 and 2.

For example, the stacked structure illustrated in the cross-sectional views according to the foregoing embodiments is an example, and thus the present disclosure is not limited to the foregoing stacked structure. In other words, as with the stacked structure described above, any stacked structure which is capable of implementing the characteristic function of the present disclosure is also included in the present disclosure. For example, another layer may be disposed between the layers of the above-described stacked structure, to the extent that functions equivalent to the functions of the foregoing stacked structure can be implemented.

In addition, although the foregoing embodiments exemplify principal materials included in each layer of the stacked structure, each layer may include other materials to the extent that functions equivalent to the functions of the foregoing stacked structure can be implemented.

In addition, the structural components described in the accompanying drawings and detailed description include, not only the structural components essential to solving the problem, but also the structural components that are not essential to solving the problem but are included in order to exemplify the aforementioned technique. As such, description of these non-essential structural elements in the accompanying drawings and the detailed description should not be taken to mean that these non-essential structural elements are essential.

Furthermore, since the foregoing embodiments are for exemplifying the technique according to the present disclosure, various changes, substitutions, additions, omissions, and so on, can be carried out within the scope of the Claims or its equivalents.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The phosphor wheel according to the present disclosure is applicable to a projection image display apparatus or other lighting devices.

What is claimed is:

1. A phosphor wheel, comprising:
a substrate;
a light reflection layer disposed on one surface of the substrate;
a phosphor layer; and
a bonding layer which is located between and bonds the light reflection layer and the phosphor layer, wherein
the bonding layer contains a particle which is higher in thermal conductivity than a base material of the bonding layer and higher in light reflectance than the light reflection layer.

2. The phosphor wheel according to claim 1, wherein the light reflection layer includes a silver alloy, and has a light reflectance of 90% or greater.

3. The phosphor wheel according to claim 1, wherein the bonding layer has a thickness ranging from 30 µm to 80 µm inclusive.

4. The phosphor wheel according to claim 1, wherein the particle contained in the bonding layer is formed of titanium oxide.

5. The phosphor wheel according to claim 1, wherein the particle contained in the bonding layer is formed of alumina.

6. The phosphor wheel according to claim 1, wherein the particle contained in the bonding layer comprises a particle formed of titanium oxide and a particle formed of alumina.

7. The phosphor wheel according to claim 1, wherein the substrate has a discotic shape, and
the phosphor layer and the bonding layer are each formed in a belt-like shape along a circumference of the substrate.

8. A light source device, comprising:
the phosphor wheel according to claim 1;
an excitation light source; and
an optical system which guides light emitted from the excitation light source, to the phosphor wheel.

9. A projection image display apparatus, comprising the light source device according to claim 8.

10. A method of manufacturing a phosphor wheel, comprising:
disposing a light reflection layer on one surface of a substrate;
forming a phosphor layer;
disposing a bonding layer on the light reflection layer; and
fixedly bonding the phosphor layer which has been formed, to the light reflection layer, by mounting the phosphor layer which has been formed, on the bonding layer, wherein
the bonding layer contains a particle which is higher in thermal conductivity than a base material of the bonding layer and higher in light reflectance than the light reflection layer.

* * * * *